US010416920B2

(12) United States Patent
Kishore et al.

(10) Patent No.: US 10,416,920 B2
(45) Date of Patent: *Sep. 17, 2019

(54) SYSTEM AND METHOD FOR IMPROVING MEMORY TRANSFER

(71) Applicant: ARM Finance Overseas Limited, Cambridge (GB)

(72) Inventors: Karagada R. Kishore, Saratoga, CA (US); Kevin D. Kissell, Menlo Park, CA (US); Georgi Z. Beloev, Walnut Creek, CA (US)

(73) Assignee: ARM Finance Overseas Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,862

(22) Filed: Nov. 30, 2015

(65) Prior Publication Data

US 2016/0098206 A1 Apr. 7, 2016

Related U.S. Application Data

(63) Continuation of application No. 12/652,598, filed on Jan. 5, 2010, now Pat. No. 9,218,183.

(Continued)

(51) Int. Cl.
*G06F 3/06* (2006.01)
*G06F 9/30* (2018.01)
(Continued)

(52) U.S. Cl.
CPC ............ *G06F 3/065* (2013.01); *G06F 3/0619* (2013.01); *G06F 3/0656* (2013.01);
(Continued)

(58) Field of Classification Search
CPC .. G06F 9/30032; G06F 9/30043; G06F 9/325; G06F 9/544; G06F 13/28
See application file for complete search history.

(56) References Cited

U.S. PATENT DOCUMENTS 4,453,229 A * 6/1984 Schaire ................. G06F 13/124
710/109
4,797,851 A * 1/1989 Suzuki .................... G06F 13/28
360/49

(Continued)

FOREIGN PATENT DOCUMENTS

EP 405882 A2 1/1991
EP 0474450 A2 3/1992
(Continued)

OTHER PUBLICATIONS

ARM968E-S, Technical Reference Manual, Copyright 2004, 2006 ARM Limited.*

(Continued)

*Primary Examiner* — Ramon A. Mercado
(74) *Attorney, Agent, or Firm* — Patterson Thuente Pedersen, P.A.

(57) ABSTRACT

System and method for performing a high-bandwidth memory copy. Memory transfer instructions allow for copying of data from a first memory location to a second memory location without the use of load and store word instructions thereby achieving a high-bandwidth copy. In one embodiment, the method includes the steps of (1) decoding a destination address from a first memory transfer instruction, (2) storing the destination address in a register in the bus interface unit, (3) decoding a source address from a second memory transfer instruction, and (4) copying the contents of a memory location specified by the source memory address to a memory location specified by the contents of the register. Other methods and a microprocessor system are also presented.

6 Claims, 12 Drawing Sheets

Related U.S. Application Data

(60) Provisional application No. 61/148,880, filed on Jan. 30, 2009.

(51) Int. Cl.
    | | |
    |---|---|
    | *G06F 9/32* | (2018.01) |
    | *G06F 12/0875* | (2016.01) |
    | *G06F 13/16* | (2006.01) |
    | *G06F 9/345* | (2018.01) |

(52) U.S. Cl.
    CPC .......... *G06F 3/0683* (2013.01); *G06F 9/3004* (2013.01); *G06F 9/30032* (2013.01); *G06F 9/30043* (2013.01); *G06F 9/325* (2013.01); *G06F 9/345* (2013.01); *G06F 12/0875* (2013.01); *G06F 13/1673* (2013.01); *G06F 2212/452* (2013.01)

(56) References Cited

U.S. PATENT DOCUMENTS

| | | | | |
|---|---|---|---|---|
| 5,185,694 | A * | 2/1993 | Edenfield | G06F 9/30032 710/107 |
| 5,313,613 | A * | 5/1994 | Gregor | G06F 9/30029 711/128 |
| 5,487,146 | A * | 1/1996 | Guttag | G09G 5/393 345/519 |
| 5,535,417 | A * | 7/1996 | Baji | G06F 13/28 710/22 |
| 5,826,106 | A * | 10/1998 | Pang | G06F 13/28 710/25 |
| 5,857,114 | A * | 1/1999 | Kim | G06F 13/28 710/22 |
| 5,884,100 | A * | 3/1999 | Normoyle | G06F 12/0897 710/52 |
| 5,996,046 | A * | 11/1999 | Yagisawa | G06F 11/1076 711/112 |
| 6,324,598 | B1 * | 11/2001 | Olson | G06F 13/28 710/22 |
| 6,421,744 | B1 * | 7/2002 | Morrison | G06F 13/28 710/22 |
| 6,453,365 | B1 * | 9/2002 | Habot | G06F 13/28 710/22 |
| 6,484,237 | B1 * | 11/2002 | Agarwala | G06F 12/0831 711/122 |
| 8,239,587 | B2 * | 8/2012 | Strulovici | G06F 12/08 710/22 |
| 8,423,721 | B2 * | 4/2013 | Moyer | G06F 12/0804 711/141 |
| 2004/0049649 | A1 * | 3/2004 | Durrant | G06F 9/30032 711/165 |
| 2005/0108446 | A1 * | 5/2005 | Inogai | G06F 13/28 710/20 |
| 2005/0149702 | A1 * | 7/2005 | Hily | G06F 9/30043 712/225 |
| 2010/0199054 | A1 | 8/2010 | Kishore et al. | |

FOREIGN PATENT DOCUMENTS

| | | |
|---|---|---|
| EP | 1396792 A1 | 3/1994 |
| GB | 2139384 A | 11/1984 |
| WO | WO 95/22110 A1 | 8/1995 |

OTHER PUBLICATIONS

ARM1136JF-S and ARM1136J-S Technical Reference Manual, Dec. 2006. (Year: 2006).*

Application and File history for U.S. Appl. No. 12/652,598, filed Jan. 5, 2010. Inventors: Kishore et al.

Sivarama P. Dandamudi, 2004. Introduction to Assembly Language Programming: For Pentium and Risc Processors (Texts in Computer Science), SpringerVerlag.

International Search Report and Written Opinion dated Apr. 28, 2010 for PCT Application No. PCT/US2010/021620, 17 pages.

IBM Technical Disclosure Bulletin, Parallel Long Movie Instruction (XP000109942), vol. 33, Issue No. 10A, pp. 21-22, Mar. 1, 1991, 2 pages.

* cited by examiner

FIG. 5

| Instruction Bit Location | 31 26 25 | 21 20 | 17 16 | 15 | 7 6 | 0 |
|---|---|---|---|---|---|---|
| | Special 2 011100 | Base | 0 | Set | Offset_9 | DESTAD 0 | MEMCOPY_UDI 011111 |

500

| Field Bit Length | 6 | 5 | 4 | 1 | 9 | 1 | 6 |

FIG. 6

| Instruction Bit Location | 31 26 25 | 21 20 | 16 15 | 7 6 | 0 |
|---|---|---|---|---|---|
| | Special 2 011100 | Base | rt | Offset_9 | CPYFRM 1 | MEMCOPY_UDI 011111 |

600

| Field Bit Length | 6 | 5 | 5 | 9 | 1 | 6 |

| rt | Reserved | PR1 | Immediate | MEMCOPY_UDI 011111 |
|---|---|---|---|---|

Instruction Bit Location: 31, 26 25, 23 22, 21, 6 5, 0

Field Bit Length: 5, 4, 1, 16, 6

| Reserved | PR1 | rs | rt | MEMCOPY_UDI 011111 |
|---|---|---|---|---|

Instruction Bit Location: 31, 17 16, 15, 11 10, 6 5, 0

Field Bit Length: 15, 1, 5, 5, 6

SYSTEM AND METHOD FOR IMPROVING MEMORY TRANSFER

RELATED APPLICATIONS

This application is a continuation of application Ser. No. 12/652,598 filed Jan. 5, 2010, which claims the benefit of U.S. Provisional Application No. 61/148,880, filed Jan. 30, 2009, each of which is incorporated by reference herein in its entirety.

COPYRIGHT NOTICES

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present invention relate generally to processors. More specifically, embodiments of the present invention relate to copying data between memory locations by a processor.

BACKGROUND OF THE INVENTION

Reduced Instruction Set Computer (RISC) processors have become well known and are used in all facets of modern society. RISC processors are generally designed with instruction sets that facilitate the use of a technique known as pipelining. Pipelining enables a processor to simultaneously process different stages of instructions. In so doing, RISC processors exploit parallelism that exists among the steps needed to process an instruction. Exploiting such instruction level parallelism allows RISC processors to execute more instructions in a shorter period of time.

Modern Complex Instruction Set Computer (CISC) processors can also benefit from instruction level parallelism by translating their instructions into micro-operations (i.e., instructions similar to those of a RISC processor). These micro-instructions can then be processed in a pipeline fashion to obtain the benefits of pipelined processing.

RISC processors are inherently inefficient at moving data between memory locations. This is because, conventional memory moves involve a load word instruction to load data from a source memory location to a general purpose register (GPR) and a subsequent store word instruction to copy the loaded data from the GPR to a destination memory location.

Execution of the load word instruction causes a load/store unit (LSU) to interface with a bus interface unit (BIU) to access data located in the source memory location. The BIU accesses the contents of the source memory location and transfers the contents to the LSU. The LSU stores the transferred contents in a GPR.

After the data is stored in the GPR, the execution unit executes a store word instruction to store the data in the GPR into a destination memory location. Execution of the store word instruction causes the LSU to move the data in the GPR to the BIU. The BIU then accesses the memory to store the data in the destination memory location, thereby completing a copy of the data from the source memory location to the destination memory location.

Executing the load word and store word instruction consumes processing resources, which limits processor throughput. This inefficiency becomes particularly acute for loads and stores having relatively high latency.

BRIEF SUMMARY OF THE INVENTION

To address the foregoing problems, new methods and systems for implementing high-bandwidth memory-to-memory copies in single and multiple processor RISC and CISC systems are needed.

In an embodiment of the present invention, there is provided a method for executing memory transfer instructions in a processor. In one embodiment, the method includes using memory transfer instructions that allow for data in a source memory location to be copied to a destination memory location without the use of load word and store word instructions. Elimination of the load word and store word instructions provides a high-bandwidth copy technique.

In an embodiment, the method includes the steps of: (1) decoding a destination address from a first memory transfer instruction (e.g., a DESTAD instruction), (2) storing the destination address in a register in a BIU, (3) decoding a source address from a second memory transfer instruction (e.g., a COPYFRM instruction), and (4) copying the contents of a memory location specified by the source memory address to a memory location specified by the contents of the register in the BIU (i.e., the destination address).

In another embodiment, the method includes the steps of (1) decoding a destination address from a first memory transfer instruction (e.g., a DESTAD instruction), (2) storing the destination address in a destination register in a BIU, (3) decoding a source address from a second memory transfer instruction (e.g., a COPYFRM instruction), (4) storing the source address in a source register in the BIU, (5) decoding a number of source memory addresses to be copied from a third instruction, (6) storing the number of source memory addresses to be copied in a loop counter in the BIU, (7) copying the contents of a memory location specified by the contents of the source register (i.e., the source address) to a memory location specified by the contents of the destination register in the BIU (i.e., the destination address), (8) decrementing the loop counter, (9) incrementing the memory address specified in the source and destination registers if the loop counter is not zero; and (10) proceeding to step 7 if the loop counter is not zero.

In yet another embodiment of the present invention there is provided memory transfer instructions that use a buffer. Execution of the memory transfer instructions cause a processor to (1) decode a destination memory address from a first memory transfer instruction, (2) store the destination memory address in a register in a BIU, (3) decode a source memory address from a second memory transfer instruction, (4) copy the contents of the memory location specified by the source memory address to a physical buffer in the BIU, and (5) copy the content of the physical buffer to the memory location specified by the destination memory address stored in the register in the BIU.

In yet another embodiment, a hardware microprocessor system comprises a processor and memory to execute memory transfer instructions. The hardware microprocessor system includes a hardware processor and memory. The hardware processor includes a BIU and an execution unit. The BIU includes a register and, optionally, a buffer and/or loop counter. The execution unit is coupled to the BIU and executes program instructions. The memory is coupled to the hardware microprocessor and stores the instructions. The instructions include a first memory transfer instruction, which specifies a destination memory address that is stored in the register, and a second memory transfer instruction, which specifies a source memory address. An optional third instruction, a CPYRNG instruction, specifies a range of source memory addresses to be copied to a range of destination addresses. Execution of the first and second instructions copies the contents of a memory location specified by the source memory address to a memory location specified by the contents of the register. Execution of the first, second, and third instructions copies the contents of the memory locations in the range of the source memory addresses to the range of destination memory locations identified by the destination memory addresses. The hardware processor can optionally include a cache memory where the destination memory address contents can be located. Optionally, the buffer is used to buffer the data being transferred prior to transfer of the data to the destination memory location.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art(s) to make and use the invention.

FIG. 5 is an exemplary DESTAD instruction format according to an embodiment of the present invention.

FIG. 6 is an exemplary COPYFRM instruction format according to an embodiment of the present invention.

FIGS. 7A and 7B are exemplary CPYRNG instruction formats according to an embodiment of the present invention.

Figure 1:
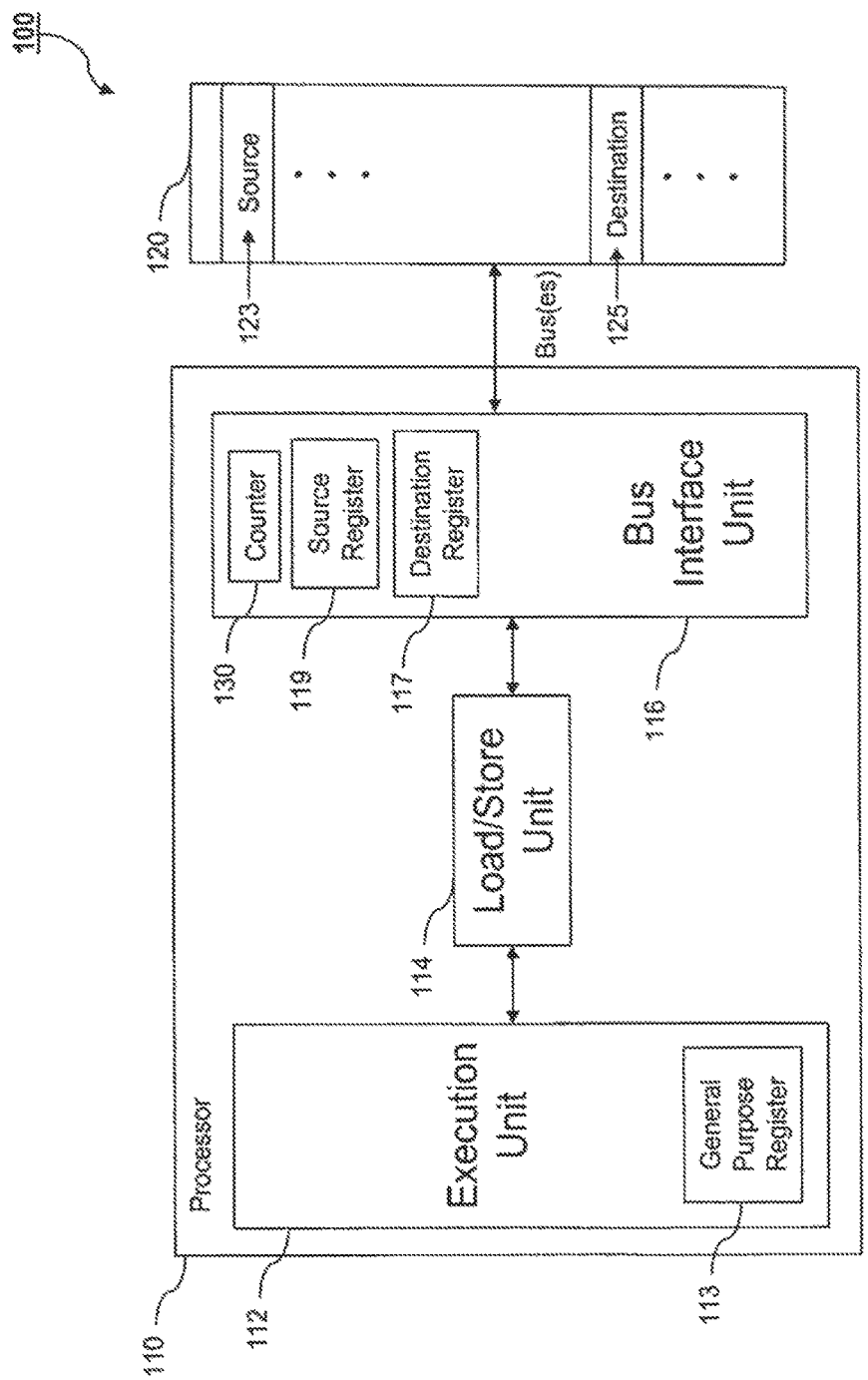
FIG. 1 is a schematic diagram of a processor according to an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Embodiments of the present invention are directed to systems and methods for copying data between memory locations. This specification discloses one or more embodiments that incorporate the features of the present invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

FIG. 1 is a schematic diagram of a processor system 100, according to an embodiment of the present invention. As shown in FIG. 1, processor system 100 includes processor 110 and memory 120. Processor 110 includes execution unit 112 with a general purpose register set (GPR) 113, load/store unit (LSU) 114, and bus interface unit (BIU) 116. BIU 116 includes a destination register 117, and optional counter 130 and source register 119. Processor 110 is coupled to memory 120 via one or more buses.

In an embodiment, memory transfer instructions are used to perform a memory-to-memory copy. In particular, embodiments of the present invention use memory transfer instructions to perform efficient copies of the contents of a source memory location to a destination memory location. In an embodiment, a memory-to-memory copy using memory transfer instructions is performed by executing two separate memory transfer instructions. The first memory transfer instruction (e.g., DESTAD) is used to store the destination address of the memory transfer operation. The second memory transfer instruction (e.g., COPYFRM) is used to copy the contents of the memory location specified by a source memory address, which may be referenced in the COPYFRM instruction, and then write those contents to the destination address.

In an exemplary operation, execution unit 112 decodes and then executes a DESTAD memory transfer instruction. The DESTAD memory transfer instruction stores a destination memory address 125 of the memory transfer operation in destination register 117. Destination memory address 125 is the address of the memory location where the data is to be transferred. More specifically, execution of the DESTAD instruction by execution unit 112 causes LSU 114 to move the destination memory address 125 specified by the DESTAD instruction to BIU 116, where the destination memory address 125 is stored in destination register 117. Execution unit 112 then executes the COPYFRM memory transfer instruction. The COPYFRM memory transfer instruction specifies a source memory address 123 that corresponds to a memory location containing data to be copied. Execution of the COPYFRM memory transfer instruction by execution unit 112 causes LSU 114 to interface with BIU 116 to copy the contents of the memory location specified by the source memory address 123 to the memory location specified by the destination memory address 125 previously stored in destination register 117. Notably, the above described embodiment does not use GPR set 113 in the memory-to-memory copy process, thereby allowing GPR set 113 to be used for other purposes.

In another embodiment, counter 130 is used in conjunction with a third instruction that specifies a range of memory address to be copied. Execution unit 112 first decodes and then executes a DESTAD memory transfer instruction. The DESTAD memory transfer instruction stores a first destination memory address 125 of the memory transfer operation in destination register 117. First destination memory address 125 is the address of the memory location where the first data item is to be transferred. More specifically, execution of the DESTAD instruction by execution unit 112 causes LSU 114 to move the first destination memory address 125 specified by the DESTAD instruction to BIU 116, where the first destination memory address 125 is stored in destination register 117. Execution unit 112 then executes a third instruction, a CPYRNG instruction. The CPYRNG instruction contains information as to the number of source addresses to be copied, e.g., a numerical value corresponding to the number of data items to move or an ending address, from which a number of addresses to be copied can be determined. In an embodiment, execution of the CPYRNG instruction stores a numerical value of the number of source addresses to be copied into counter 130.

Execution unit 112 then executes the COPYFRM memory transfer instruction. The COPYFRM memory transfer instruction specifies a source memory address 123 that contains the first memory address of a first memory location 122 containing data to be copied and stores that address in source register 119. Execution of the COPYFRM memory transfer instruction by execution unit 112 causes LSU 114 to interface with BIU 116 to copy the contents of the memory location specified in source register 119 to the memory location specified by the destination memory address 125 that has been previously stored in destination register 117. After each item of data is copied, counter 130 is decremented. If counter 130 is not zero, then the address values in source register 119 and destination register 117 are adjusted to move t the next source and destination addresses. As the value in counter is not zero, another COPYFRM memory transfer instruction is executed using the updated source and destination addresses.

Incrementing and decrementing of the registers can be accomplished using an adder (not shown). In one embodiment, the looping of the COPYFRM instruction can be implemented by stalling the fetching of additional instructions by LSU 114 until the range of copies is completed. In another embodiment, a direct memory access (DMA) controller (not shown) is used to control copying the data from the source memory locations to the destination locations in completing the range of copies.

The CPYRNG instruction can also include a priority indicator bit, e.g., PRI, that indicates to execution unit 112 and/or BIU 116 whether the range of memory copies should be done in a foreground mode, e.g., higher priority relative to currently executing instructions, or in a background more, e.g., a lower priority relative to currently executing instructions. In an embodiment, copying is performed in the foreground if the value of a PRI bit is 1, and background copying is performed if the value of the PRI bit is 0.

In addition, in an embodiment, upon execution of the CPYRNG instruction, the operating system locks, or otherwise protects, the specified range of memory locations from being modified. In this manner, the contents of the memory range are dedicated to the copy instructions until they are completed. Upon completion of the CPYRNG instruction, the operating system releases the block of memory locations. In such an embodiment, the operating system receives a notification from BIU 116 when the CPYRNG is completed. In one embodiment, a COPY_SUCCESS flag is used to indicate completion of the CPYRNG instruction. The COPY_SUCCESS flag can be stored in a status register located in BIU 116 or elsewhere in processor 110.

Figure 2:
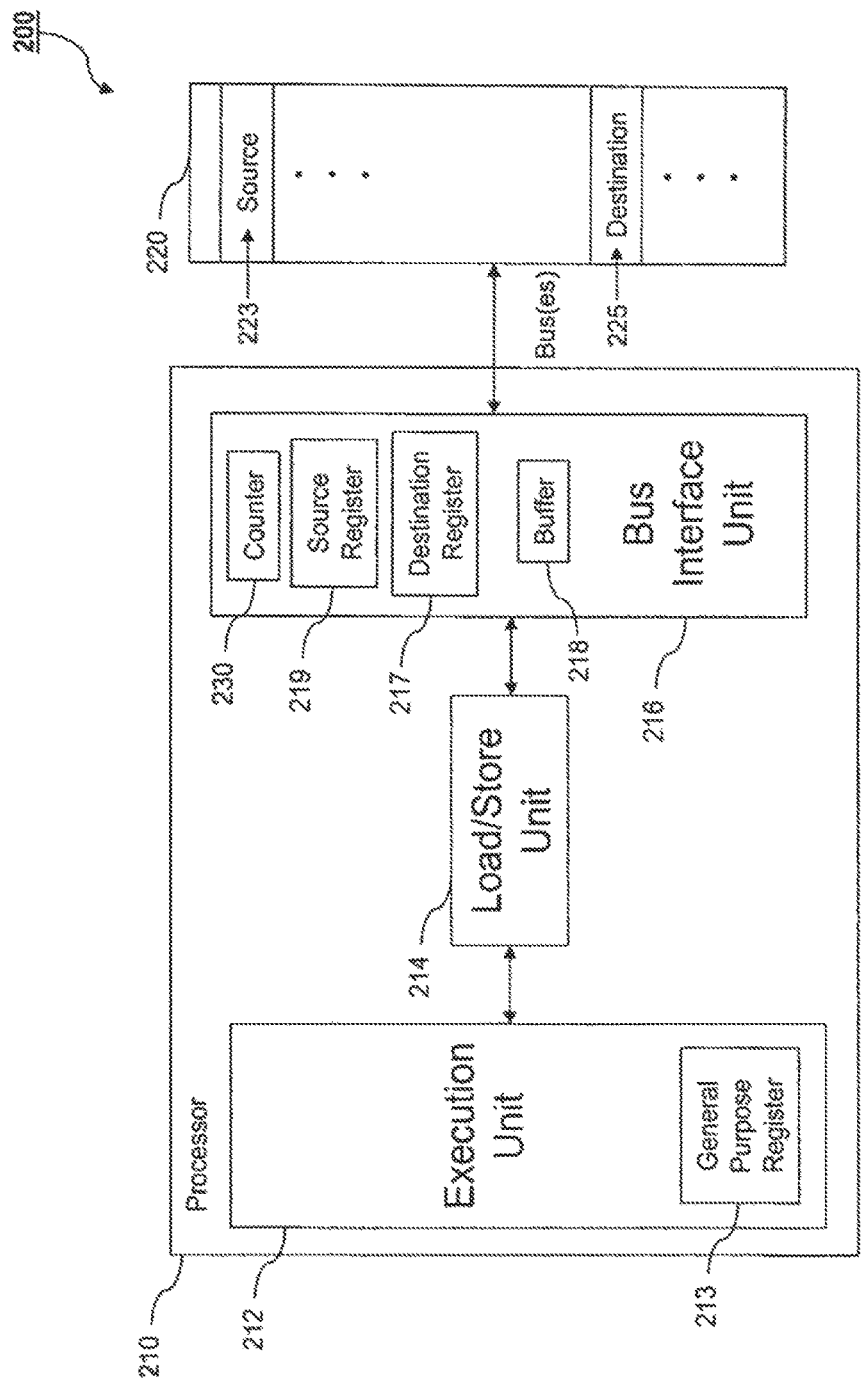
FIG. 2 is a schematic diagram of a processor according to another embodiment of the present invention.

FIG. 2 is a schematic diagram of another processor system 200, according to an embodiment of the present invention. As shown in FIG. 2, processor system 200 includes processor 210 and memory 220. Processor 210 includes execution unit 212 with a general purpose register set (GPR) 213, load/store unit (LSU) 214, and bus interface unit (BIU) 216. BIU 216 includes a destination register 217 and a buffer 218. Processor 210 is coupled to memory 220 via one or more buses.

In an embodiment, processor system 200 operates in a manner similar to processor system 100 described above. However, in processor system 200, buffer 218 is used to buffer the transfer of data from source memory location 222 to a destination memory location 224. In operation, upon execution of a COPYFRM instruction, BIU 216 copies the contents of memory location 222 specified by source memory address 223 to buffer 218. Thereafter, BIU 216 causes the contents of buffer 218 to be stored in destination memory location 224. The use of buffer 218 is optional and can be bypassed if desired.

In another embodiment, processor system 200 can execute a third instruction in a similar manner as described in processor system 100 whereby a counter 230 is used to track a range of source addresses, using source register 219, whose contents are copied to a range of destination addresses using destination register 217.

Figure 3:
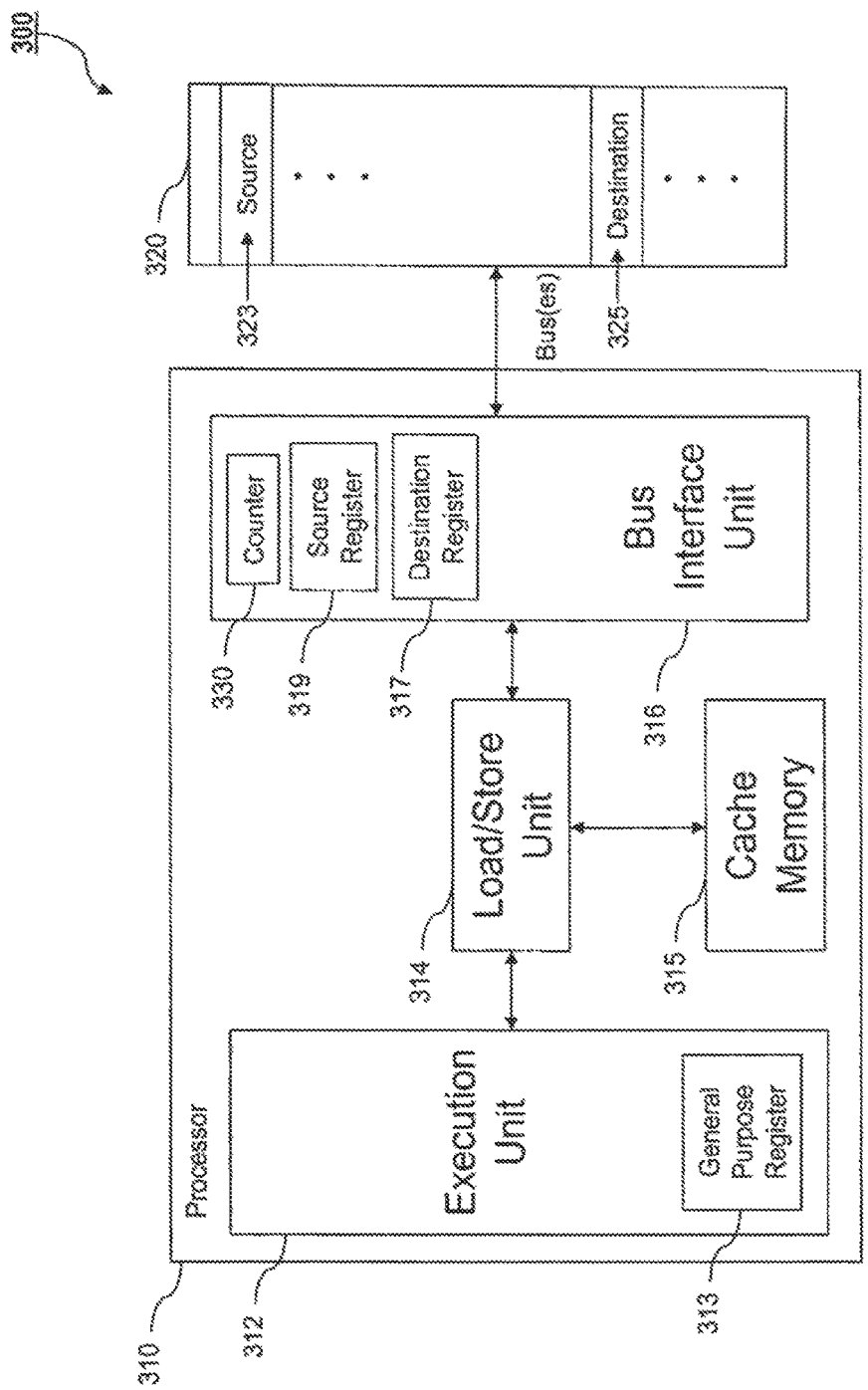
FIG. 3 is a schematic diagram of a processor according to yet another embodiment of the present invention.

FIG. 3 is a schematic diagram of another processor system 300, according to an embodiment of the present invention. As shown in FIG. 3, processor system 300 includes processor 310 and memory 320. Processor 310 includes execution unit 312 with a general purpose register (GPR) set 313, load/store unit (LSU) 314, cache memory 315, and bus interface unit (BIU) 316. BIU 316 includes a destination register 317. Processor 310 is coupled to memory 320 via one or more buses.

In an embodiment, processor system 300 operates similar to that described above for processor system 100. However, processor system 300 in FIG. 3 includes cache memory 315. Processor system 300 executes memory transfer instructions as previously described in FIG. 1. However, rather than storing the copied data to a destination memory location in memory 320, the data is copied to a cache memory 315. In another embodiment, the COPYFRM instruction can store the contents of the copied source memory address in both the destination address as well as in cache memory 315. It should also be noted that sources memory location contents 322 and the destination memory location contents 324 can be located in cache memory 315.

In another embodiment, processor system 300 can execute a CPYRNG instruction in a similar manner as described in processor system 100 whereby counter 330 is used to specify a range of source addresses, using source register 319, whose contents are copied to a range of destination addresses using destination register 317.

Figure 4:
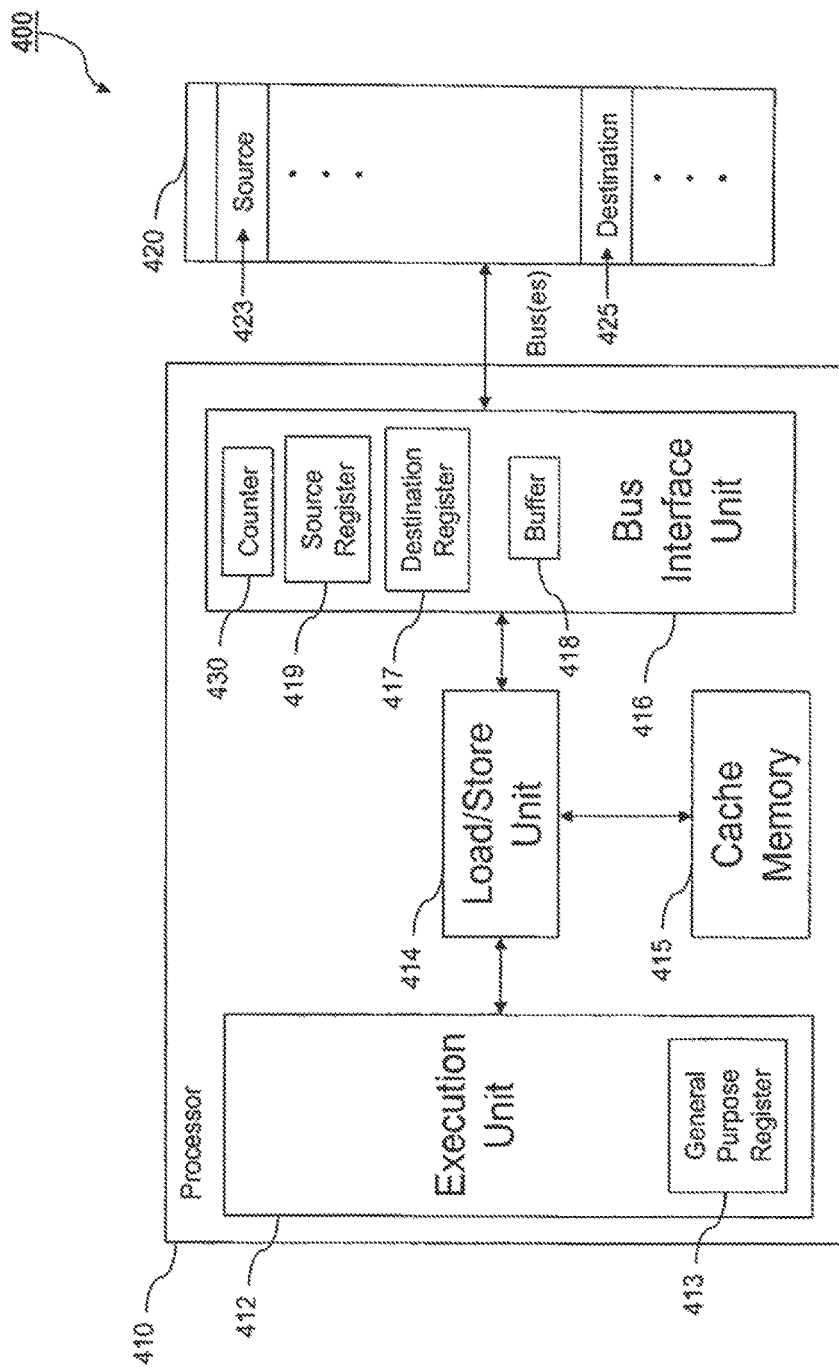
FIG. 4 is a schematic diagram of a processor according to yet another embodiment of the present invention.

FIG. 4 is a schematic diagram of another processor system 400, according to an embodiment of the present invention. As shown in FIG. 4, processor system 400 includes processor 410 and memory 420. Processor 410 includes execution unit 412 with a general purpose register set (GPR) 413, load/store unit (LSU) 414, cache memory 415, and bus interface unit (BIU) 416. BIU 416 includes a destination register 417 and a buffer 418. Processor 410 is coupled to memory 420 via one or more buses.

In an embodiment, processor system 400 performs in a similar manner as described above with respect to FIG. 3. However, processor system 400 in FIG. 4 includes buffer 418. Buffer 418 can be used to buffer the writing of data to the destination memory location 424 in memory 420 and/or cache memory 415. In operation, BIU 416 copies the contents of the memory location specified by the source memory address 423 to buffer 418 and then to the destination memory location 424 that has been previously stored in destination register 417. The use of buffer 418 is optional and can be bypassed if desired. In addition, in an embodiment, execution of the COPYFRM instruction causes the source data to be stored in both cache memory 415 and to the destination memory location at address 425.

In another embodiment, processor system 400 can execute a CPYRNG instruction in a similar manner as described above with respect to processor system 100 whereby counter 430 is used to specify a range of source addresses, using source register 419, whose contents are copied to a range of destination addresses using destination register 417.

FIG. 5 illustrates an exemplary DESTAD instruction format 500 according to an embodiment of the present invention. As shown in FIG. 5, the exemplary DESTAD instruction includes seven fields. In FIG. 5 the field size is provided below each field and the bit locations of each field in the 32 bit instruction is shown above each field. The format of the DESTAD instruction is:

DESTAD base, offset
DESTAD. SET base, offset.

The format of the DESTAD instruction is further described in Table 1.

TABLE 1

| FIELD | SIZE | Description | BITS |
| --- | --- | --- | --- |
| MEMCOPY_UDI 011111 | 6 | Identifies Instruction as a Memory Transfer | 0-5 |
| DESTAD 0 | 1 | Identifies Instruction as DESTAD | 6 |
| Offset_9 | 9 | Memory offset added to base register for effective address | 7-15 |
| Set | 1 | Sets copy success flag if 1 | 16 |
| 0 | 4 | Future Use | 17-20 |
| Base | 5 | Base Address | 21-25 |
| Special 2 011100 | 6 | Sub-Opcode Identifier | 26-31 |

The purpose of the DESTAD instruction is to set the destination memory address for a high-bandwidth memory copy operation. The DESTAD instruction can be described where an offset is generated by sign-extending the offset-.sub.-9 field and concatenating the result with two bits of least-significant zeroes. The offset is added to the contents of the base register to generate an effective address. This address is translated by a memory management unit (MMU) if necessary, generating translation lookaside buffer (TLB) miss and protection faults in the same manner as a store instruction. The resulting physical address is retained in hardware state, for example stored in a register in the BIU, and an internal valid-destination-address flag is set. The valid-destination-address flag is cleared whenever some event (e.g. an exception) occurs that would invalidate the retained physical address or break the flow of control between a DESTAD and a subsequent COPYFRM instruction.

Further, if the set bit is a 1, the instruction also sets a copy-success flag internal to the memory copy hardware. The copy_success flag is tested by a COPYFRM instruction with a non-zero rt field and cleared if there is a failure of this test. The DESTAD instruction is unaffected by local CorExtend Enable bits, and does not cause a CorExtend Unusable exception. However, if the value in the base register is not a word-aligned address, the retained translated address value is unpredictable. The possible exceptions with the DESTAD instruction include TLB Refill, TLB Invalid, TLB Modified, and Address Error.

FIG. 6 is a diagram of an exemplary COPYFRM instruction format 600 according to an embodiment of the present invention. The exemplary COPYFRM instruction includes six fields. In FIG. 6 the field size is provided below each field and the bit locations of each field in the 32 bit instruction are shown above each field. The syntax of the COPYFRM instruction is:

COPYFRM rt, base, offset

The format of the COPYFRM instruction is further described in Table 2.

TABLE 2

| FIELD | SIZE | Description | BITS |
| --- | --- | --- | --- |
| MEMCOPY_UDI 011111 | 6 | Identifies Instruction as a Memory Transfer | 0-5 |
| COPYFRM 1 | 1 | Identifies Instruction as COPYFRM | 6 |
| Offset_9 | 9 | Memory offset added to base register for effective address | 7-15 |
| Rt | 5 | Copy success flag | 16-20 |
| Base | 5 | Base Address | 21-25 |
| Special 2 011100 | 6 | Sub-Opcode Identifier | 26-31 |

The purpose of the COPYFRM instruction is to initiate a memory-to-memory copy, whose destination address was set by a previous DESTAD instruction, and whose source address is defined by offset+base. The COPYFRM instruction can be described where an offset is generated by sign-extending the offset.sub.-9 field and concatenating the result with two bits of least-significant zeroes. The offset is added to the contents of the base register to generate an effective address. This address is translated by the MMU if necessary, generating TLB miss and protection faults in the same manner as a load instruction.

If the valid-destination-address flag is set when the COPYFRM instruction issues, a memory copy is performed from the effective address computed by the COPYFRM instruction to the effective address calculated by the preceding DESTAD instruction. If the valid-destination-address flag is not set, no copy is performed, and the internal copy-success flag is cleared.

The rt register is used as a destination, receiving 1 if the internal copy-success flag is set at the retirement of the COPYFRM, and zero if it is not. If rt is zero, the copy success flag need not be sampled. The COPYFRM instruction is unaffected by local CorExtend Enable bits, and does not cause a CorExtend Unusable exception.

DESTAD/COPYFRM pairs allow for very efficient memory-to-memory copies that do not require the data being copied to pass through a CPU's GPRs. In an embodiment, the source and destination addresses have the same offset from the beginning of a cache line. However, if the value in the base register is not a word-aligned address, the resulting memory state is unpredictable. The possible exceptions with the COPYFRM instruction include TLB Refill, TLB Invalid, Address Error, and Bus Error.

The following pseudocode is for a memory transfer instruction DESTAD that may be implemented according to an embodiment of the present invention.

©2009 MIPS Technologies, Inc.
Operation:

```
vAddr <- GPR[base] + (sign_extend(offset) || 0²);
(pAddr, CCA) <- AddressTranslation(vAddr, DATA, STORE);
DESTAD(CCA,pAddr,vAddr,DATA);
```

Exception:
TLB Refill, TLB Invalid, TLB Modified, Address ErrorTLB exception.
Implementation:

```
DESTAD(CCA,pAddr,vAddr,DATA){
    if (AddressTranslation(vAddr, DATA, STORE) == SUCCESS){
        if(CacheLookup(vAddr) == MISS){
            send out snoop request on the bus to get
            ownership of this line [If MP support is needed];
        }
        LSU.DEST_ADDR = pAddr; // write pAddr at graduation
        LSU.DEST_ADDR_GOOD = 1;
        if(set == 1){
            LSU.COPY_SUCCESS = 1; // write status at graduation
        }
    }
    else {
        if (vAddr is uncacheable){
            LSU.DEST_ADDR_GOOD = 0;
        }
        if (vAddr translation not successful){
            Appropriate TLB exception on vAddr;
        }
    }
}
©2009 MIPS Technologies, Inc.
```

The following pseudocode is for a memory transfer instruction COPYFRM that may be implemented according to an embodiment of the present invention.

©2009MIPS Technologies, Inc.
Operation:

```
vAddr <- GPR[base] + (sign_extend(offset) || 0²);
(pAddr, CCA) <- AddressTranslation(vAddr, DATA, STORE);
COPYFRM(CCA,pAddr,vAddr,DATA);
```

Exception:
TLB Refill, TLB invalid, TLB modified, Bus Error, Cache Error.
Implementation:

```
COPYFRM(CCA,pAddr,vAddr,DATA){
    if (AddressTranslation(vAddr, DATA, LOAD) == SUCCESS){
        // Source Line is in the cache
        if(CacheLookup(vAddr) == HIT){
            if (LSU.DEST_ADDR_GOOD){
                if (LSU.DEST_ADDR is in the Cache){
                    Invalidate cache line;
                }
                Evict line at (vAddr,pAddr) from cache into WBB;
                Set Writeback Address for evicted line to
                LSU.DEST_ADDR;
            }
            else {
                LSU.COPY_SUCCESS = 0;
            }
        }
        // Source Line is not in the cache
        else {
            if (LSU.DEST_ADDR_GOOD){
                if (LSU.DEST_ADDR is in the Cache){
                    Invalidate cache line;
                }
                Fetch line at (vAddr,pAddr) from memory into FSB;
                Writeback line from FSB into WBB;
                Set Writeback Address for written back line to
                LSU.DEST_ADDR;
                Line is NOT written into the cache;
            }
            else {
                LSU.COPY_SUCCESS = 0;
            }
        }
    }
    else {
        if (vAddr is uncacheable){
            LSU.COPY_SUCCESS = 0;
        }
        if (vAddr translation not successful){
            TLB exception on vAddr;
        }
    }
}
©2009 MIPS Technologies, Inc.
```

The following pseudo code for a memory copy loop that can be used with the DESTAD and COPYFRM memory transfer instructions that may be implemented, according to an embodiment of the present invention.

```
©2009 MIPS Technologies, Inc.
memcopy(Src, Dst, copysize){
    linesize = getCacheLineSize( );
    if (CheckAlign(Src,Dst, linesize) &&
        copysize > MinSizeToMakeThisWorthWhile_k){
            Src = CopyPartialLine(linesize,Src,1);
            rDst = CopyPartialLine(linesize,Dst,0);
            numOfLines = getNumOfLines(copysize,linesize);
            memcopyLineOps(rSrc,rDst,numOfLines);
    }
    else {
        default_library_memcopy(Src,Dst,copysize);
    }
```

-continued

```
}
CheckAlign(Src, Dst, linesize){
    if (Src and Dst have same offset from line)
        return(success);
    else
        return (failure);
}
CopyPartialLine(linesize,Addr,begin){
    if (begin){
        use lw,sw to copy from Addr to end of cacheline;
        return (lineaddr at the end of copied words);
    }
    else {
        use lw,sw to copy from cacheline boundary to Addr;
        return (lineaddr at the beginning of copied words);
    }
}
memcopyLineOps(rSrc, rDst, numOfLines){
// rSrc is line-aligned source address (VA) start;
// rDst is line-aligned destination address (VA) start;
// numOfLines is the number of cachelines
// unroll count = 4;
    for (i=0;i<numOfLines; ){
        DESTAD.SET <rDst+line*0>;
        COPYFRM <rSrc+line*0>;
        DESTAD <rDst+line*1>;
        COPYFRM <rSrc+line*1>;
        DESTAD <rDst+line*2>;
        COPYFRM <rSrc+line*2>;
        DESTAD <rDst+line*3>;
        COPYFRM <rSrc+line*3>; // rt != 0
        i += CheckSuccess(rt);
    }
    return(status);
}
        ©2009 MIPS Technologies, Inc.
```

FIG. 7A is a diagram of an exemplary CPYRNG instruction format 700 according to an embodiment of the present invention. The exemplary CPYRNG instruction includes five fields and uses an immediate address value as the first address. In FIG. 7A the field size is provided below each field and the bit locations of each field in the 32 bit instruction is shown above each field.

TABLE 6 further describes the format of the CPYRNG instruction.

| FIELD | SIZE | Description | BITS |
|---|---|---|---|
| MEMCOPY_UDI 011111 | 6 | Identifies Instruction as a Memory Transfer | 0-5 |
| Immediate | 16 | Contains address of initial location to be copied | 6-21 |
| PRI | 1 | Indicates Priority of Instruction (1 = foreground, 1 = background) | 22 |
| Reserved | 4 | Future Use | 23-26 |
| rt | 6 | Register containing the number of addresses to copy | 27-31 |

The purpose of the CPYRNG instruction is to initiate a memory-to-memory copy over a range of addresses where the initial destination address was set by a previous DESTAD instruction, and whose initial source address is defined by the value in the immediate field. The rt register contains the number of copies to be performed. Alternatively, the rt register could contain the address of the final location to be copied. In the latter case, the number of locations to copy is derived from the source address and the final location address.

FIG. 7B is a diagram of an exemplary CPYRNG instruction format 700' according to another embodiment of the present invention. The exemplary CPYRNG instruction includes five fields and uses registers to contain the initial address of the copy and the number of locations to be copied. In FIG. 7B the field size is provided below each field and the bit locations of each field in the 32 bit instruction is shown above each field.

TABLE 7 further describes the format of the alternate CPYRNG instruction.

| FIELD | SIZE | Description | BITS |
|---|---|---|---|
| MEMCOPY_UDI 011111 | 6 | Identifies Instruction as a Memory Transfer | 0-5 |
| rt | 5 | Register containing the address of initial location to be copied | 6-10 |
| rs | 5 | Register containing the number of addresses to copy | 11-15 |
| PRI | 1 | Indicates Priority of Instruction (1 = foreground, 0 = background) | 16 |
| Reserved | 15 | Future Use | 17-31 |

The purpose of the CPYRNG instruction is to initiate a memory-to-memory copy over a range of addresses where the initial destination address was set by a previous DESTAD instruction, and whose initial source address is defined by the value in the rt register. The rs register contains the number of copies to be performed. Alternatively, the rs register could contain the address of the final location to be copied. In the later case, the number of locations to copy is derived from the source address and the final location address.

Figure 8:
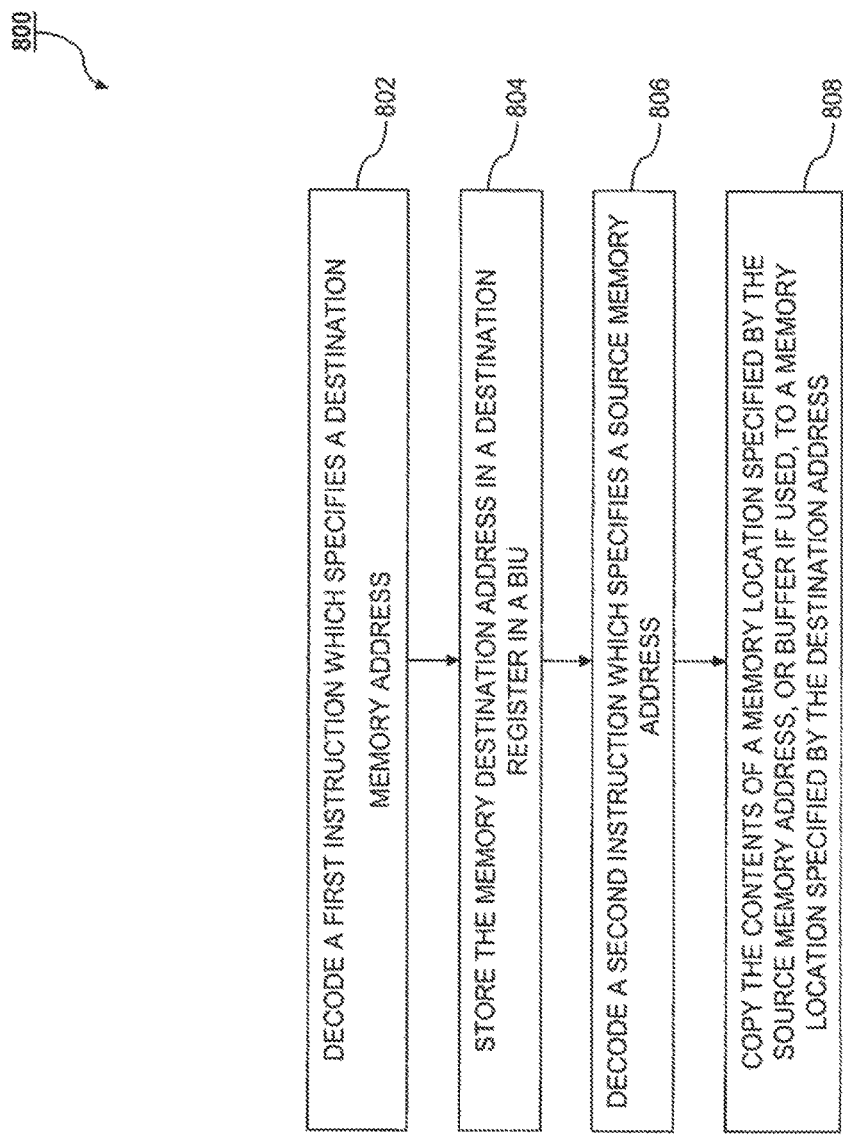
FIG. 8 is a flowchart of a method of copying data between memory locations according to an embodiment of the present invention.

FIG. 8 is a flowchart of a method 800 for a memory-to-memory copy, according to an embodiment of the present invention.

In method 800, a memory transfer starts with step 802. In step 802, a first memory transfer instruction, (e.g., DESTAD), containing a destination address is decoded and executed. The first memory transfer instruction is executed by an execution unit in a processor that identifies the destination memory address for a memory-to-memory copy. In step 804, a LSU interfaces with a BIU to store the decoded destination address in a register located in the BIU. In step 806, a second memory transfer instruction is executed that contains the source memory address for the memory-to-memory copy, (e.g., COPYFRM). In step 808 the contents of the memory location specified by the source memory address, or the buffer if used, are copied to a memory location specified by the destination address, which is contained within the register of the BIU.

Figure 9:
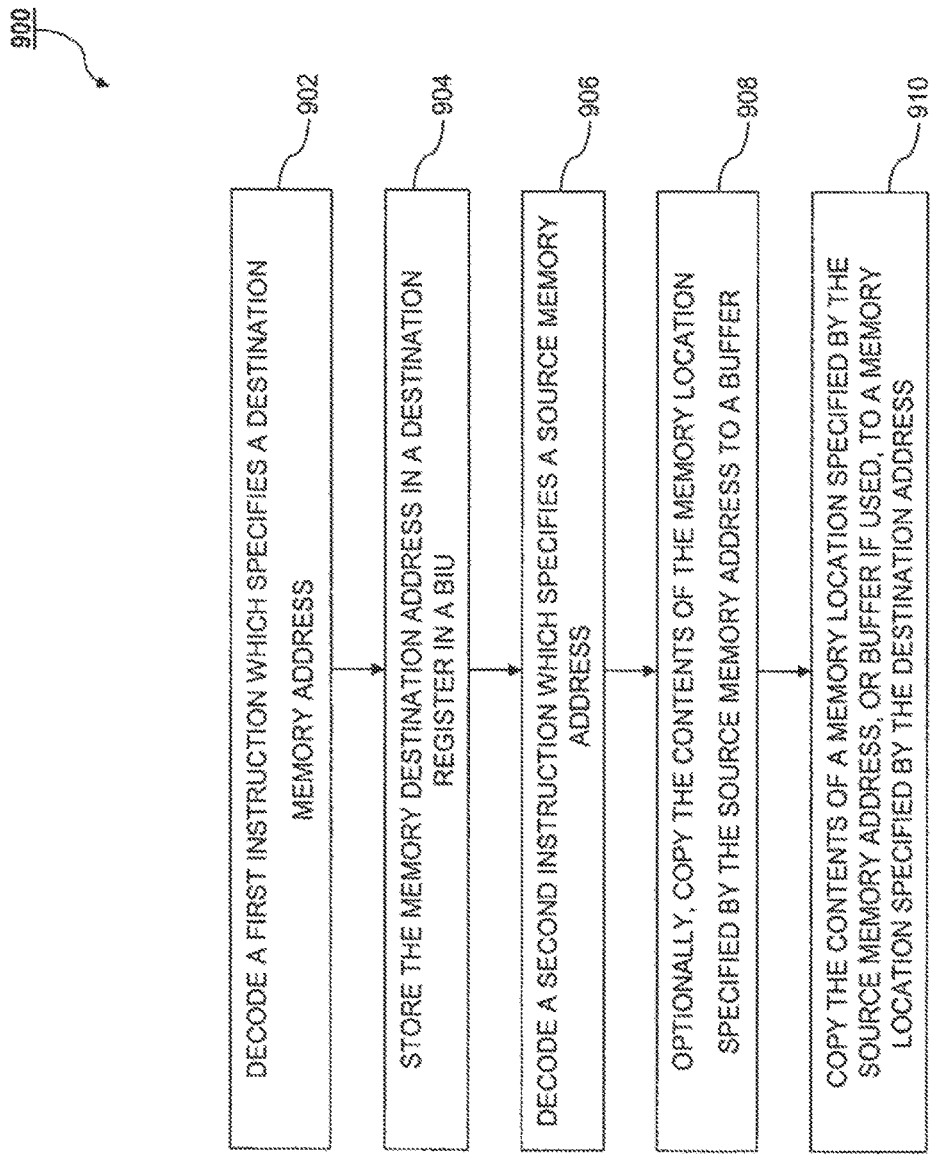
FIG. 9 is a flowchart of a method of copying data between memory locations according to another embodiment of the present invention.

FIG. 9 is flowchart of a method 900 for a memory-to-memory copy, according to another embodiment of the present invention.

In method 900, a memory transfer starts with step 902. In step 902, a first memory transfer instruction, (e.g., DESTAD), containing a destination address is decoded and executed. The first memory transfer instruction is executed by an execution unit in a processor that identifies the destination memory address for a memory-to-memory copy. In step 904, a LSU interfaces with a BIU to store the decoded destination address in a register located in the BIU. In step 906, a second memory transfer instruction is executed that decodes the source memory address for the memory-to-memory copy, (e.g., COPYFRM). In optional step 908, the LSU unit interfaces with the BIU to copy the contents of the memory location specified by the source memory address to a buffer located in the BIU. In step 910 the contents of the memory location specified by the source memory address, or the buffer if used, are copied to a memory location specified by the destination address, which is contained within the register of the BIU.

Figure 10:
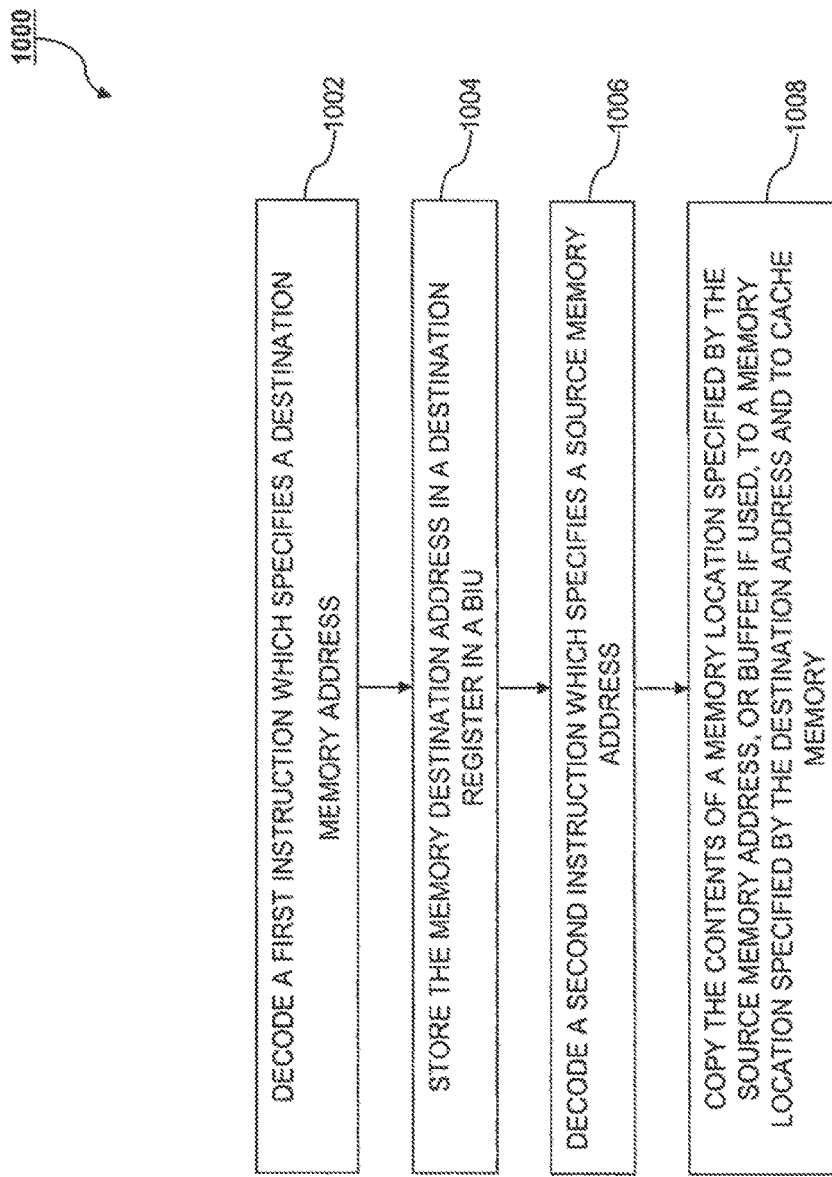
FIG. 10 is a flowchart of a method of copying data between memory locations according to yet another embodiment of the present invention.

FIG. 10 is a flowchart of a method 1000 for a memory-to-memory copy, according to another embodiment of the present invention.

In method 1000, a memory transfer starts with step 1002. In step 1002, a first memory transfer instruction, (e.g., DESTAD), containing a destination address is decoded and executed. The first memory transfer instruction is executed by an execution unit in a processor that identifies the destination memory address for a memory-to-memory copy. In step 1004, a LSU interfaces with a BIU to store the decoded destination address in a register within the BIU. In step 1006, a second memory transfer instruction is executed that decodes the source memory address for the memory-to-memory copy, (e.g., COPYFRM). In step 1010, the contents of the memory location specified by the source memory address, or the buffer if used, are copied to a memory location specified by the destination address, which is stored within the register of the BIU, and/or to cache memory.

Figure 11:
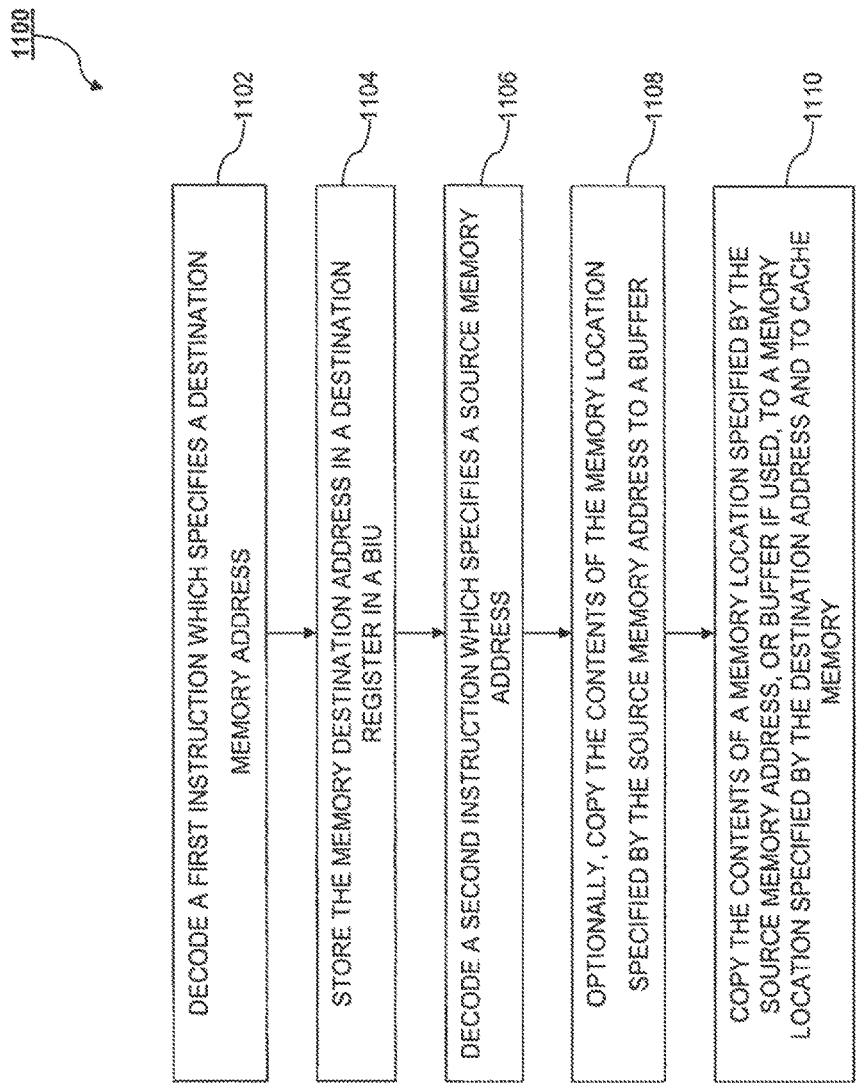
FIG. 11 is a flowchart of a method of copying data between memory locations according to yet another embodiment of the present invention.

FIG. 11 is a flowchart of a method 1100 for a memory-to-memory copy, according to another embodiment of the present invention.

In method 1100, a memory transfer starts with step 1102. In step 1102, a first memory transfer instruction, (e.g., DESTAD), containing a destination address is decoded and executed. The first memory transfer instruction is executed by an execution unit in a processor that identifies the destination memory address for a memory-to-memory copy. In step 1104, a LSU interfaces with a BIU to store the decoded destination address in a register within the BIU. In step 1106, a second memory transfer instruction is executed that decodes the source memory address for the memory-to-memory copy, (e.g., COPYFRM). In optional step 1108, the LSU unit interfaces with the BIU to copy the contents of the memory location specified by the source memory address to a buffer in the BIU. In step 1110, the contents of the memory location specified by the source memory address, or the buffer if used, are copied to a memory location specified by the destination address, which is contained within the register of the BIU, as well as to cache memory.

Figure 12:
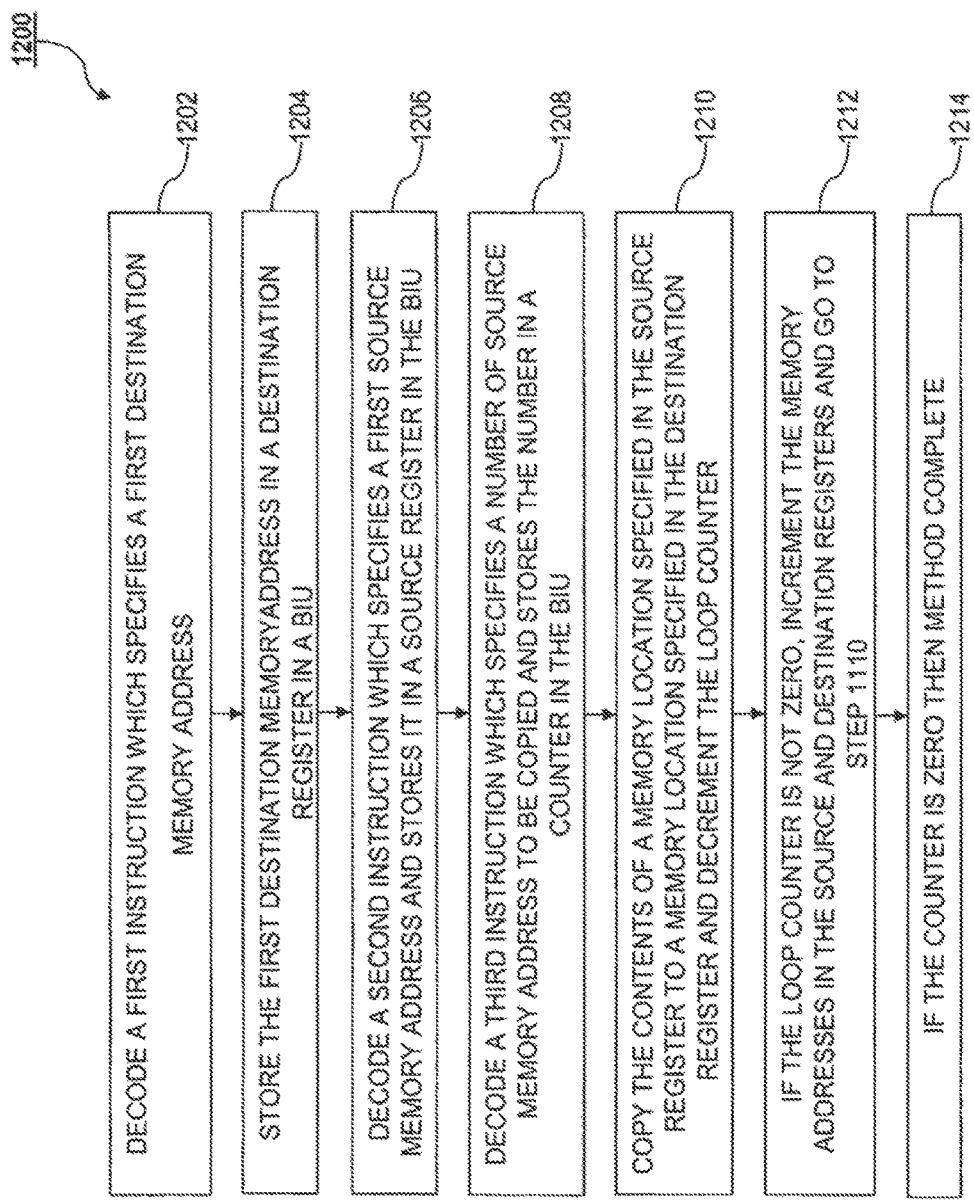
FIG. 12 is a flowchart for a method of copying data between memory locations according to yet another embodiment of the present invention.

FIG. 12 is a flowchart of a method 1200 for a memory-to-memory copy, according to another embodiment of the present invention.

In method 1200, a memory transfer starts with step 1202. In step 1202, a first memory transfer instruction, (e.g., DESTAD), containing a destination address is decoded and executed. The first memory transfer instruction is executed by an execution unit in a processor that identifies the destination memory address for a memory-to-memory copy. In step 1204, a LSU interfaces with a BIU to store the decoded destination address in a destination register within the BIU. In step 1206, a second memory transfer instruction is executed that decodes the source memory address for the memory-to-memory copy, (e.g., COPYFRM) and stores the source memory address in a source register in the BIU. In step 1208, the execution unit executes and decodes a third instruction (e.g., a CPYRNG instruction). The third instruction contains information as to the number of source addresses to be copied, e.g., an immediate numerical value or an ending address from which a number of addresses to be copied can be determined. Execution of the third instruction stores a numerical value of the number of source addresses to be copied into a counter. In step 1210, the contents of the source memory location specified by the source register in the BIU are copied to a memory location specified by the destination address, which is specified by the destination register in the BIU. In addition, the value in the counter is decremented. In step 1212, the loop counter is checked to see if it is zero. If the counter is not zero, the addresses in the source and destination registers are incremented in the BIU, and execution continues in step 1210 to perform the next memory to memory copy. If the counter value is zero then the method ends in step 1214.

Figure 13:
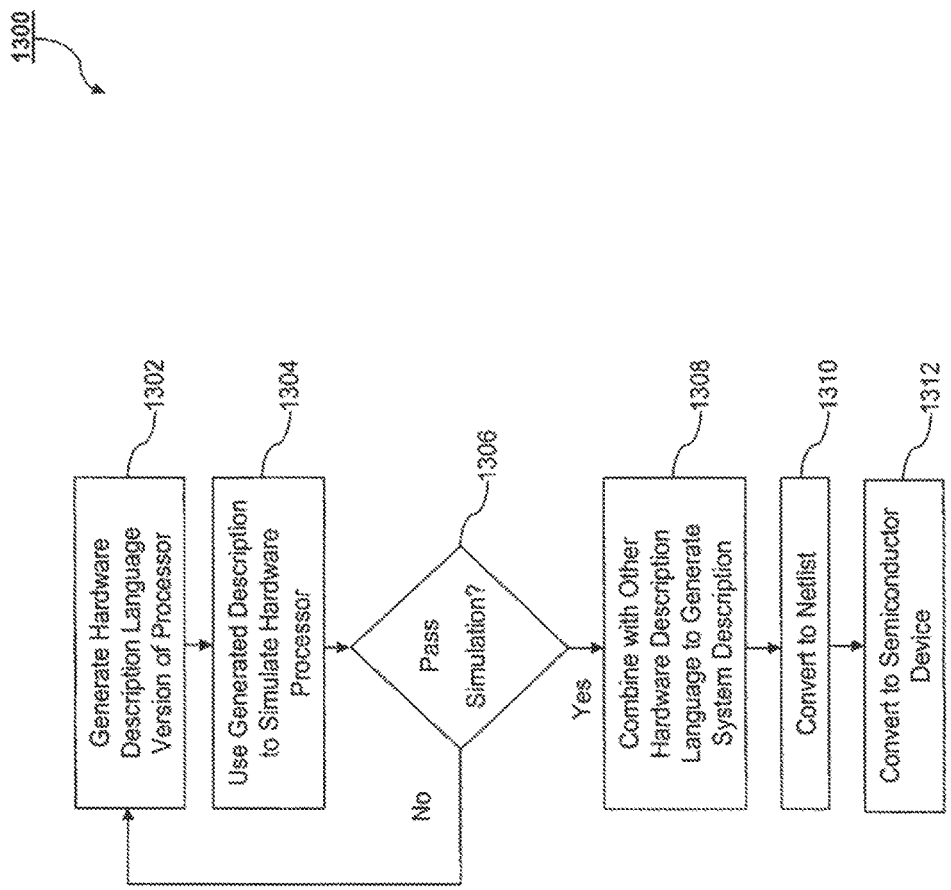
FIG. 13 is a flowchart for a method of generating a hardware processor system according to an embodiment of the present invention.

FIG. 13 is a flowchart for a method of generating a hardware processor system according to an embodiment of the present invention. In step, 1302 a hardware description language version of a processor as described above is generated. The hardware description language can be Verilog HDL, VHDL, SystemC Register Transfer Level (RTL) and so on. In step 1304, the hardware description language version of the processor is used to simulate an operational hardware processor. In step 1306, the simulation is analyzed. If the simulated processor passes the simulation criteria, the method continues in step 1308. If the simulation processor does not meet the simulation criteria, changes are made to the processor and steps 1302 through 1306 are repeated.

After the simulated processor passes the simulation criteria, in step 1308 the hardware description language version of the processor is combined with other hardware description languages device descriptions to generate a system level description. In step 1310, the system level hardware description language description is converted to a netlist, such as for example, GDS2. In step 1312, the netlist is used to generate a hardware system device corresponding to the netlist.

In operation, the hardware description language version of the processor can be generated at a first geographic location and transmitted to a second geographic location as a data signal. The second geographic location may be remote from the first geographic location. The data signal represents the hardware description language version of the processor generated in step 1302. The received data signal can be used at the second geographic location to generate a representation of the hardware processor for the simulation to be carried out in step 1304. When the simulation passes all simulation criteria, the hardware processor system can be generated as described above in steps 1308 to 1312 at the second geographic location.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including, as described above, Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The invention claimed is:

1. A method of copying data in a microprocessor, the microprocessor including a first processor comprising an execution unit, a load/store unit operably coupled to the execution unit, a cache memory operably coupled to the load/store unit and a bus interface having a register and a buffer, the microprocessor further including a first memory operably coupled to the bus interface unit, the method comprising:
    decoding a first instruction using the execution unit, wherein the first instruction specifies a destination memory address of the first memory;
    storing, with the load/store unit, the destination memory address of the first memory in the register in the bus interface unit;
    decoding a second instruction using the execution unit, wherein said second instruction specifies a source memory address of the first memory;
    copying, as directed by the execution unit, the contents of a first memory location specified by the source memory address to the buffer, wherein the load/store unit interacts with the bus interface unit to copy the contents of the first memory location to the buffer; and
    copying, as directed by the execution unit, the contents of the buffer to both a second memory location specified by the destination memory address in the register and the cache memory operably coupled to the load/store unit, wherein the load/store unit interacts with the bus interface unit to copy the contents of the buffer to the second memory location.

2. A method of copying data in a microprocessor, the microprocessor including a first processor comprising an execution unit, a load/store unit, a cache memory operably coupled to the load/store unit and a bus interface having a destination register, a source register, a buffer and a loop counter, the microprocessor further including a first memory operably coupled to the bus interface unit, the method, comprising:
    (a) decoding a first instruction, wherein the first instruction specifies a first destination memory address;
    (b) storing, with the load/store unit, the first destination memory address in the destination register;
    (c) decoding a second instruction, wherein said second instruction specifies a first source memory address;
    (d) storing, with the load/store unit as directed by the execution unit, the first source memory address in the source register;
    (e) decoding a third instruction, wherein said instruction specifies a number of source memory addresses to be copied;
    (f) storing, with the load/store unit the number of source memory addresses to be copied in the loop counter;
    (g) copying, with the load/store unit as directed by the execution unit, the contents of a memory location specified in the source register to the buffer;
    (h) copying, with the load store unit, the contents of the buffer to both a memory location specified in the destination register and the cache memory operably coupled to the load/store unit;
    (i) decrementing the loop counter;
    (j) incrementing the address locations specified in the source and destination registers if the loop counter is not zero; and
    (k), proceeding to step (g) if the value in the loop counter is not zero.

3. The method of claim 2, wherein the contents of at least one of the memory addresses specified in the source or destination registers reside in a cache memory.

4. A microprocessor system, comprising:
    a processor, comprising:
    a bus interface unit, which includes a register, a buffer, a loop counter, and a source register;
    a load/store unit operably coupled to the bus interface unit and to a cache memory;
    an execution unit, operably coupled to the load/store unit, that executes program instructions; and
    a first memory, coupled to said microprocessor, that stores said instructions, said instructions including:
    a first instruction that causes the load/store unit to interact with the bus interface unit to store a destination memory address in the register,
    a second instruction that specifies a source memory address and causes the load store unit as directed by the execution unit to interact with the bus interface unit to copy the contents of a first memory location specified by the source memory address to be copied to the buffer, and copied from the buffer to both a second memory location specified by the destination memory address in the register and the cache memory operably coupled to the load/store unit, and a third instruction that specifies a range of source memory addresses to be copied to a range of destination addresses.

5. The microprocessor system of claim 4, wherein the first instruction is a DESTAD instruction.

6. The microprocessor system of claim 4, wherein the second instruction is a COPYFRM instruction.

* * * * *